United States Patent

Sasaki et al.

[11] Patent Number: 5,192,436
[45] Date of Patent: Mar. 9, 1993

[54] TAP WATER PURIFIER TO BE DIRECTLY COUPLED TO FAUCET PIPE

[75] Inventors: Tsutomu Sasaki, 30-21, Otsuhata-cho, Misagagi, Yamashina-ku, Kyoto; Satoshi Sasaki, Kyoto, both of Japan

[73] Assignee: Tsutomi Sasaki, Kyoto, Japan

[21] Appl. No.: 793,865

[22] Filed: Nov. 18, 1991

[30] Foreign Application Priority Data

Nov. 21, 1990 [JP] Japan ............................. 2-319096
Apr. 24, 1991 [JP] Japan ............................. 3-122562

[51] Int. Cl.$^5$ .......................................... B01D 27/08
[52] U.S. Cl. ................................. 210/264; 210/282; 210/424; 210/446; 137/562
[58] Field of Search ............... 210/136, 264, 282, 287, 210/440, 443, 446, 447, 449, 424, 420; 137/115, 329.1, 544, 546, 562

[56] References Cited

U.S. PATENT DOCUMENTS

| | | | |
|---|---|---|---|
| 3,853,761 | 12/1974 | McClory | 210/449 |
| 4,107,046 | 8/1978 | Carder | 210/449 |
| 4,147,631 | 4/1979 | Deines et al. | |
| 4,271,020 | 6/1981 | Van Meter | |
| 4,686,037 | 8/1987 | Lang | 210/449 |
| 4,904,382 | 2/1990 | Thomsen | 210/446 |

FOREIGN PATENT DOCUMENTS

| | | |
|---|---|---|
| 22984 | 7/1985 | Japan. |
| 2093005 | 8/1982 | United Kingdom. |
| 2156489 | 10/1985 | United Kingdom. |

OTHER PUBLICATIONS

Pamphlet "Mizumaru", published by Tensho Company, Ltd., of Japan.

Primary Examiner—Robert A. Dawson
Assistant Examiner—Wanda L. Millard
Attorney, Agent, or Firm—Morgan & Finnegan

[57] ABSTRACT

There is provided a tap water purifier to be directly coupled to a faucet pipe, which includes a water purifying barrel filled with a filter medium and a cylindrical valve body integral with the purifying barrel. The purifying barrel having opposite opening ends. The valve body is inserted in a cylindrical bore formed in a casing for rotation about the longitudinal axis of the valve body. The casing has tap water inlet port means, tap water outlet port means and purified water outlet port means formed therein, the tap water inlet port means and the purified water outlet port means opening to the cylindrical bore in the casing at an angular distance of 180° from each other in the same axial position. The valve body includes first and second flow path means formed therein, the first flow path means being communicated with one opening end of the purifying barrel, the second flow path means being communicated with the other opening end of the purifying barrel. The first and second flow path means open to the peripheral surface of the valve body at an angular distance of 180° from each other in an axial position corresponding to the opening positions of the tap water inlet port means and the purified water outlet port means. The valve body also includes third flow path means formed therein and communicated with the tap water outlet port means. The third flow path means opens to the peripheral surface of the valve body in an angular position between the opening positions of the first and second flow path means and in the axial position corresponding to the opening position of the tap water inlet port means.

8 Claims, 4 Drawing Sheets

TAP WATER PURIFIER TO BE DIRECTLY COUPLED TO FAUCET PIPE

BACKGROUND OF THE INVENTION

1. Field of Invention

The invention relates to a tap water purifier to be directly coupled to a faucet pipe for purifying tap water from the faucet pipe.

2. Description of the Prior Art

A tap water purifier to be directly coupled to a faucet pipe has been commonly used, which comprises a water purifying barrel filled with a filter medium such as active carbon, ceramics or hollow yarn. The purifying barrel is received in a receptacle which is fixedly connected to a changeover cock. The changeover cock is attached to the opening end of a faucet pipe so that the tap water flows from the faucet pipe into the purifying barrel in the receptacle through the changeover cock. The tap water is purified by the filter medium in the purifying barrel and then discharged from the lower end of the receptacle. The changeover cock includes a lever which can be turned through a given angle to switch the flow path in the changeover cock so that the tap water is discharged from the lower end of the changeover cock without passing through the receptacle and the purifying barrel. The purifying barrel is cartridge type which can be removed from the receptacle for exchange for a fresh one when the water purifier has been used for a long time and the purifying effect thereof is lowered.

The tap water purifier has a problem that the purifying barrel is subject to internal contamination with the dirt, iron rust or algae contained in the tap water as it is used. The contamination causes a hotbed of germs. The contamination also results in the clogging of the filter medium. Therefore, it is desirable to periodically clean the purifying barrel in the receptacle to eliminate the contamination before it is exchanged for a fresh one. However, it is virtually difficult to periodically clean the purifying barrel in the receptacle. In addition, the tap water purifier has another problem that water channels are formed in the filter medium as it is used so that the tap water flows through the water channels without being purified effectively.

Further, it is known that chlorine is contained in the tap water from the faucet pipe, the chlorine having a sterilizing effect. It is also known that the chlorine is removed from the tap water by the filter medium in the tap water purifier so that no chlorine is contained in the purified water discharged from the lower end of the receptacle. When the faucet of the faucet pipe is closed to stop the tap water, the purified water devoid of chlorine is stagnant between the purifying barrel in the receptacle and the lower end of the receptacle. Accordingly, in the case where the tap water purifier is left unused for a long time, various germs adhere to the lower end of the receptacle and breed in the purified water to enter the purifying barrel and breed therein.

OBJECTS OF INVENTION

Accordingly, an object of the invention is to provide a new and improved tap water purifier to be directly coupled to a faucet pipe, which overcoming the problems described above.

Another object of the invention is to periodically clean the purifying barrel in the tap water purifier.

Another object of the invention is to prevent the filter medium in the purifying barrel from being formed with a water channels.

Another object of the invention is to prevent various germs from entering the purifying barrel to breed therein.

SUMMARY OF THE INVENTION

According to the invention, a tap water purifier to be directly coupled to a faucet pipe is provided, which includes a water purifying barrel filled with a filter medium and a cylindrical valve body integral with the purifying barrel. The purifying barrel has opposite opening ends. The valve body is inserted in a cylindrical bore formed in a casing for rotation about the longitudinal axis of the valve body. The casing has tap water inlet port means, tap water outlet port means and purified water outlet port means formed therein, the tap water inlet port means and the purified water outlet port means opening to the cylindrical bore in the casing at an angular distance of 180° from each other in the same axial position. The valve body includes first and second flow path means formed therein, the first flow path means being communicated with one opening end of the purifying barrel, the second flow path means being communicated with the other opening end of the purifying barrel. The first and second flow path means open to the peripheral surface of the valve body at an angular distance of 180° from each other in an axial position corresponding to the opening positions of the tap water inlet port means and the purified water outlet port means. The valve body also includes third flow path means formed therein and communicated with the tap water outlet port means. The third flow path means opens to the peripheral surface of the valve body in an angular position between the opening positions of the first and second flow path means and in the axial position corresponding to the opening position of the tap water inlet port means.

The casing may be attached to the opening end of a faucet pipe so that the faucet pipe is communicated with the tap water inlet port means of the casing.

The valve body may extend horizontally below the opening end of the faucet pipe, the tap water inlet port means extending between the opening end of the faucet pipe and the valve body, the tap water outlet port means and the purified water outlet port means extending downwardly of the valve body.

The first flow path means may comprise an axial hole and a radial hole formed in the valve body and communicated with each other, the axial hole of the first flow path means being communicated with the one opening end of the purifying barrel, the radial hole of the first flow path means opening to the peripheral surface of the valve body. The second flow path means may comprise an axial hole and a radial hole formed in the valve body and communicated with each other, the axial hole of the second flow path means being communicated with the other opening end of the purifying barrel, the radial hole of the second flow path means opening to the peripheral surface of the valve body.

The third flow path means may comprise axial groove means formed in the peripheral surface of the valve body in an angular position between the opening positions of the first and second flow path means. The axial groove means extends axially of the valve body to open to the peripheral surface of the valve body in the axial position corresponding to the opening position of the tap water inlet port means. The third flow path means may further comprise annular groove means formed in the peripheral surface of the valve body. The annular groove means extends peripherally of the valve body to be communicated with the axial groove means and the tap water outlet port means of the casing.

The purifying barrel may be received in a receptacle for removal therefrom. The receptacle is disposed outwardly of the casing and attached to the valve body for removal therefrom so that the receptacle can be operated to turn it integrally with the purifying barrel and the valve body about the longitudinal axis of the valve body.

The purifying barrel may be received in a receptacle for rotation about the longitudinal axis of the valve body and attached to the valve body for removal therefrom. The receptacle is attached to the casing for removal therefrom. A lever is disposed outwardly of the casing and attached to the valve body on the opposite side to the purifying barrel and the receptacle so that the lever can be operated to turn it integrally with the valve body and the purifying barrel.

The purifying barrel may be disposed outwardly of the casing and attached to the valve body for removal therefrom to turn the lever integrally with the valve body and the purifying barrel.

BRIEF DESCRIPTION OF THE DRAWINGS

The accompanying drawings illustrate principals and preferred embodiments of the invention, and together with the description serve to explain the principals of the invention, in which.

DETAILED DESCRIPTION OF THE PREFERRED EMBODIMENT

Figure 1:
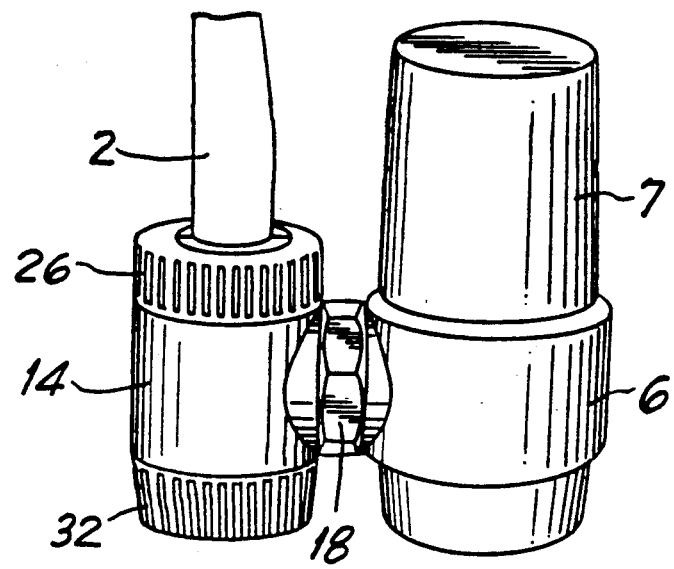
FIG. 1 is a perspective view showing a tap water purifier according to the invention with a receptacle disposed in its vertical position.
Figure 2:
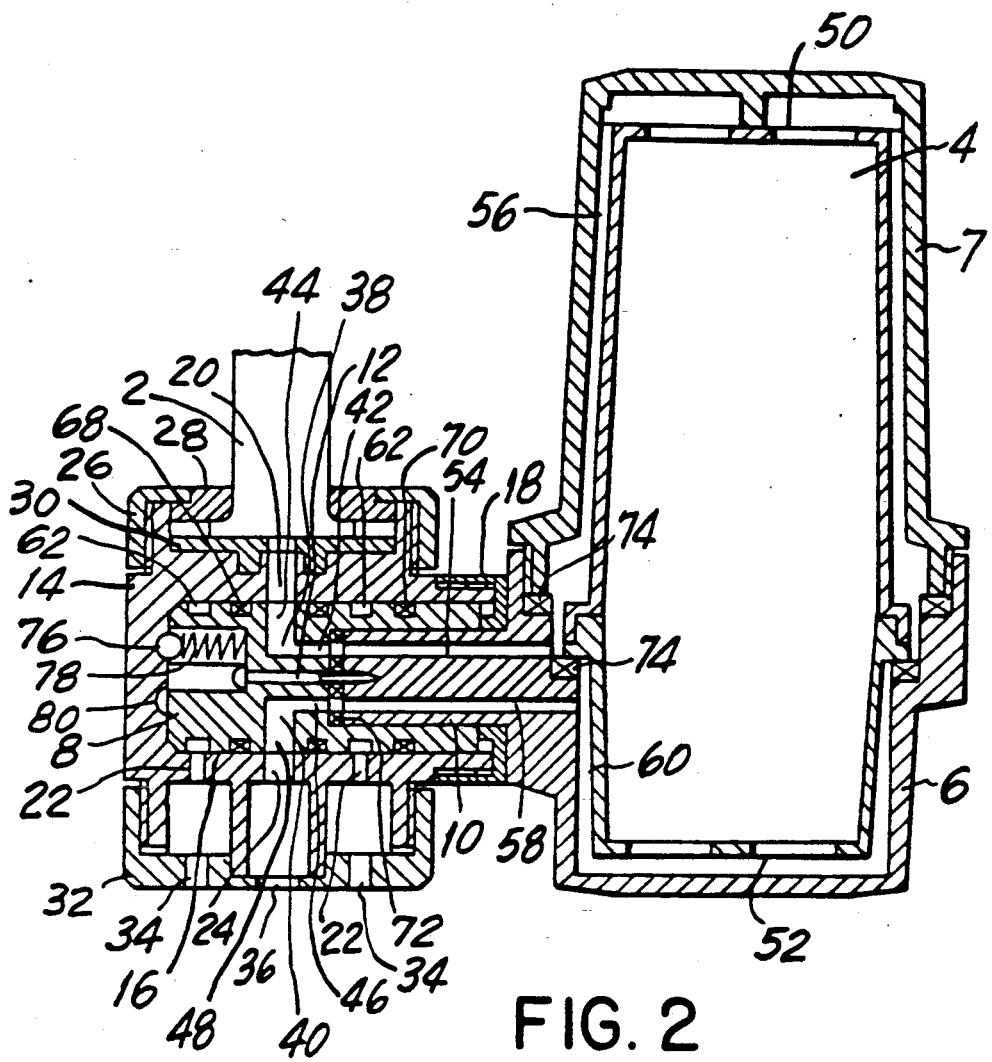
FIG. 2 is a sectional view of the tap water purifier of FIG. 1.

Referring to FIG. 1, a tap water purifier is illustrated, which is directly coupled to a faucet pipe 2 to purify tap water from the faucet pipe 2. The tap water purifier comprises a water purifying barrel 4 which is filled with a filter medium, such as active carbon, ceramics or hollow yarn, and inserted and received in a receptacle 6, as shown in FIG. 2. The purifying barrel 4 is cartridge tipe which can be removed from the receptacle 6 for exchange for a fresh one. The receptacle 6 includes a cover 7 which can be removed when exchanging the purifying barrel 4. The tap water purifier also includes a cylindrical valve body 8 which is integral with the purifying barrel 4. In the embodiment, the receptacle 6 includes a cylindrical portion 10 projecting therefrom. The valve body 8 includes a central bore formed therein, the cylindrical portion 10 being inserted and received in the central bore. A fastening screw 12 is passed through a hole formed in the valve body 8 and fitted in and threadedly engaged with a hole formed in the cylindrical portion 10 whereby the receptacle 6 is fixedly attached to the valve body 8 and the valve body 8 and the purifying barrel 4 are integrated with each other.

The tap water purifier further comprises a casing 14 including a cylindrical bore 16 formed therein for the valve body 8. The valve body 8 is inserted in the cylindrical bore 16 in the casing 14 for rotation about the longitudinal axis of the valve body 8, the receptacle 6 being disposed outwardly of the casing 14. A cap nut 18 is threadedly engaged with the outer thread of the casing 14 and abutted against the end surface of the valve body 8 to hold the valve body 8 in the cylindrical bore 16. Accordingly, the receptacle 6 can be operated to turn it integrally with the purifying barrel 4 and the valve body 8 about the longitudinal axis of the valve body 8.

The casing 14 has a tap water inlet port 20, a pair of tap water outlet ports 22 and a purified water outlet port 24 formed therein. The tap water inlet port 20 and the tap water outlet port 24 extend in diametrical opposite directions to each other to open to the cylindrical bore 16 of the casing 14 at an angular distance of 180° from each other in the same axial position. The tap water outlet ports 24 extend radially of the casing 14 to open to the cylindrical bore 16 of the casing 14 in positions axially spaced from the purified water outlet port 24 on the opposite sides thereof.

The casing 14 is attached to the opening end of the faucet pipe 2 by a cap nut 26 and a split ring 28 so that the faucet pipe 2 is communicated with the tap water inlet port 20 of the casing 14. The cap nut 26 is threadedly engaged with the outer thread of the casing 14, the split ring 28 being interposed between the cap nut 26 and the faucet pipe 2. In addition, a rubber packing 30 is interposed between the faucet pipe 2 and the casing 14 around the inlet port 20 for sealing. The valve body 8 extends horizontally below the opening end of the faucet pipe 2, the tap water inlet port 20 extending between the opening end of the faucet pipe 2 and the valve body 8, the tap water outlet ports 22 and the purified water outlet port 24 extending downwardly of the valve body 8. A shower head 32 comprising a cap nut is threadedly engaged with the outer thread of the casing 14. The shower head 32 includes a number of small holes 34 and a central hole 36 formed therein, the small holes 34 being communicated with the tap water outlet ports 22, the central hole 36 being communicated with the purified water outlet port 24.

The valve body 8 includes first and second flow paths 38 and 40, the first flow path 38 comprising an axial hole 42 and a radial hole 44 formed in the valve body 8, the second flow path 40 comprising an axial hole 46 and a radial hole 48 formed in the valve body 8. The purifying barrel 4 has opposite opening ends 50 and 52, the axial hole 42 of the first flow path 38 being communicated with one opening end 50 of the purifying barrel 4 by means of a axial hole 54 formed in the cylindrical portion 10 and a flow channel 56 formed between the cover 7 and the purifying barrel 4. The axial hole 46 of the second flow path 40 is communicated with the other opening end 52 of the purifying barrel 4 by means of a axial hole 58 formed in the cylindrical portion 10 and a flow channel 60 formed between the receptacle 6 and the purifying barrel 4. The radial holes 44 and 48 of the first and second flow paths 38 and 40 extend in diametrical opposite directions to each other to open to the peripheral surface of the valve body 8 at an angular distance of 180° from each other in an axial position corresponding to the opening positions of the tap water inlet port 20 and the purified outlet port 24.

Figure 3:
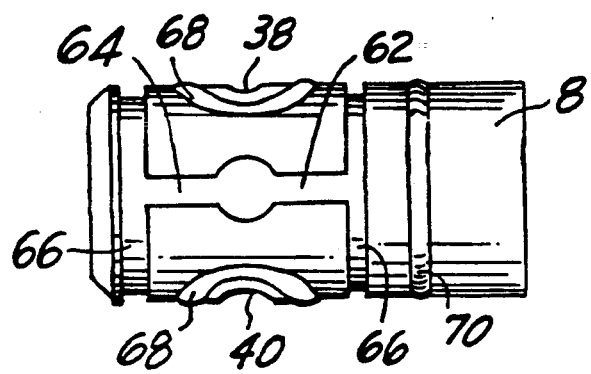
FIG. 3 is a side view of the valve body of FIG. 2.

The valve body 8 also includes a third flow path 62 which comprises an axial groove 64 formed in the peripheral surface of the valve body 8 in an angular position between the opening positions of the first and second flow paths 38 and 40, as shown in FIG. 3. The axial groove 64 extends axially of the valve body 8 to open to the peripheral surface of the valve body 8 in the angular position between the opening positions of the first and second flow paths 38 and 40 and in the axial position corresponding to the opening position of the tap water inlet port 20. The radial hole 44 and the axial groove 64 of the first and third flow paths 38 and 62 are positioned at an angular distance of 90° from each other, the radial hole 48 and the axial groove 64 of the second and third flow paths 40 and 62 being also positioned at an angular distance of 90° from each other. The third flow path 62 further comprises a pair of annular grooves 66 formed in the peripheral surface of the valve body 8 in positions axially spaced from the first and second flow paths 38 and 40 on the opposite sides thereof. The annular grooves 66 extend peripherally of the valve body 8 to be communicated with the axial groove 64 and the tap water outlet ports 22 of the casing 14.

The valve body 8 includes a pair of sealing rings 68 extending around the opening positions of the first and second flow paths 38 and 40 and sealingly engaged with inner surface of the casing 14. The valve body 8 also includes a sealing ring 70 extending peripherally of the valve body 8 and sealingly engaged with inner surface of the casing 14. Sealing rings 72 are interposed between and sealingly engaged with the cylindrical portion 10 of the receptacle 6 and the valve body 8 on the outside and inside of the first and second flow paths 38 and 40. The receptacle 6 includes sealing rings 74 extending along the inner surface of the receptacle 6 and sealingly engaged with the purifying barrel 4 and the cover 7.

Further, a ball 76 and a spring 78 are installed between the valve body 8 and the casing 14. A plurality of recesses 80 are formed in the bottom of the casing 14. The recesses 80 are positioned at angular intervals in a circle extending about the longitudinal axis of the valve body 8. The ball 76 is resiliently urged by the spring 78 to fit in one of the recesses 80 every time the valve body 8 is turned through 90° so as to ascertain the angle of rotation of the valve body 8.

Accordingly, the receptacle 6 can be operated to turn it integrally with the valve body 8 and the purifying barrel 4. When the receptacle 6 and the purifying barrel 8 are turned to a vertical position as shown in FIG. 1 and the ball 76 fits in one of the recesses 80 in the casing 14, the valve body 8 is turned to the angular position shown in FIG. 2. The first flow path 38 is therefore aligned and communicated with the tap water inlet port 20 of the casing 14. The second flow path 40 is simultaneously aligned and communicated with the purified water outlet port 24 of the casing 14. Accordingly, the tap water flows from the faucet pipe 2 to the flow channel 56 in the receptacle 6 through the tap water inlet port 20 and the first flow path 38 to enter the one opening end 50 of the purifying barrel 4. The tap water then passes through the purifying barrel 4 to be purified by the filter medium therein and discharged from the other opening end 52 of the purifying barrel 4. The purified water is directed to the purified water outlet port 24 through the flow channel 60 and the second flow path 40 and discharged from the central hole 36 of the shower head 32.

Figure 4:
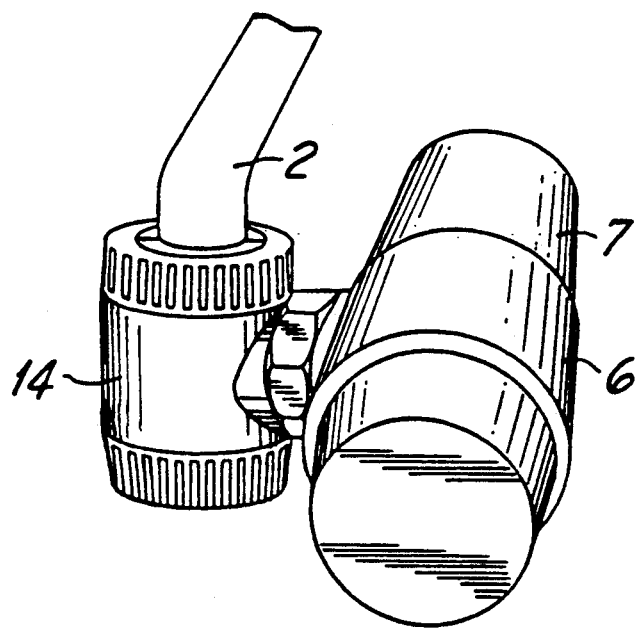
FIG. 4 is a perspective view of the tap water purifier of FIG. 1 with the receptacle turned to its horizontal position.

When the receptacle 6 and the purifying barrel 4 are turned through 90° from the vertical position shown in FIG. 1 to a horizontal position as shown in FIG. 4 and the ball 76 fits in another recess 80, the valve body 8 is also turned through 90° from the angular position shown in FIG. 2. The third flow path 62 is therefore aligned and communicated with the tap water inlet port 20 of the casing 14. The tap water flows from the faucet pipe 2 to the tap water outlet ports 22 through the tap water inlet port 20 and the third flow path 62 so that the tap water is discharged from the small holes 34 in the shower head 32 without passing through the receptacle 6 and the purifying barrel 4.

When the receptacle 6 and the purifying barrel 4 are turned through 180° from the vertical position shown in FIG. 1 to be disposed upside down and the ball 76 fits in the recess 80, the second flow path 40 is aligned and communicated with the tap water inlet port 20, contrary to the angular position shown in FIG. 2. The first flow path 38 is simultaneously aligned and communicated with the purified water outlet port 24. Accordingly, the tap water flows from the faucet pipe 2 to the flow channel 60 in the receptacle 6 through the tap water inlet port 20 and the second flow path 40 to enter the other opening end 52 of the purifying barrel 4 so that the tap water is forced to reversely flow through the purifying barrel 4. The tap water is then discharged from the one opening end 50 of the purifying barrel 4, directed to the purified water outlet port 24 through the flow channel 56 and the first flow path 38 and discharged from the central hole 36 of the shower head 32.

In the tap water purifier, when the tap water is forced to reversely flow through the purifying barrel 4, the purifying barrel 4 can be cleaned by the reversely flowing water. In order to force the tap water to reversely flow, it is merely required to simply turn the receptacle 6. Accordingly, it is easy to periodically clean the purifying barrel 4 so that the purifying barrel 4 is not subject to internal contamination with the dirt, iron or algae contained in the tap water. The germs will therefore not bleed in the water purifying barrel 4. The filter medium in the purifying barrel 4 will be not clogged. In addition, water channels formed in the filter medium are broken by the reversely flowing water. Accordingly, the tap water can effectively purified by passing through the filter medium.

In addition, when the receptacle 6 and the valve body 8 are disposed in the angular position shown in FIGS. 1 and 2, the purified water is contained in the flow channel 60 in the receptacle 6 and the second flow path 40 in the valve body 8, the purified water including no chlorine. However, in the first flow path 38 in the valve body 8 and the flow channel 56 in the receptacle 6, there is contained the tap water which is discharged from the faucet pipe 2 and not yet purified. The tap water includes chlorine therein, the chlorine having a sterilizing effect. Accordingly, when the tap water purifier is left unused for a long time, it is preferable that the receptacle 6 is turned through 180° from the vertical position shown in FIG. 1 to be disposed upside down after the faucet of the faucet pipe 2 is closed to stop the tap water so that the first flow path 38 and the flow channel 56 are communicated with the purified water outlet port 24. Even if various germs adhere to the purified water outlet port 24 and enter the first flow path 38, they are shut out by the chlorine in the unpurified tap water contained in the first flow path 38 and the flow channel 56 so that the germs never enter the purifying barrel 4. As to the second flow path 40 and the flow channel 60 in which the purified water is contained, the second flow path 40 is communicated with the tap water inlet port 20 which is connected to the faucet pipe 2. Accordingly, the germs are shut out by the tap water in the faucet pipe 2, the germs never entering the second flow path 40. The germs therefore never enter and breed in the purifying barrel 4.

Figure 5:
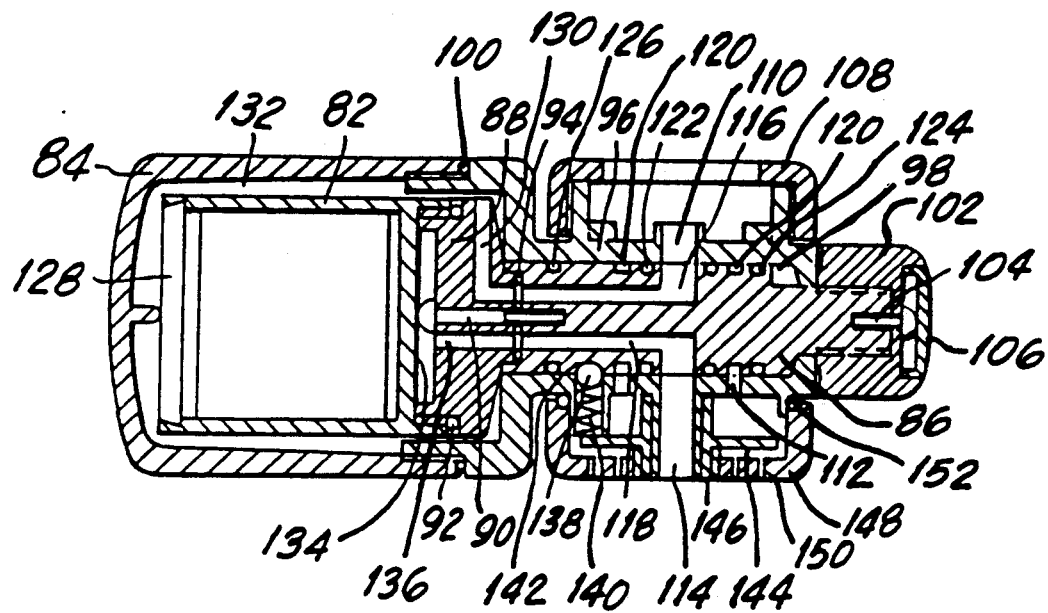
FIG. 5 is a sectional view showing another embodiment.

Referring to FIG. 5, another embodiment of the invention is illustrated, which includes a water purifying barrel 82 received in a receptacle 84 for rotation about the longitudinal axis of a valve body 86. The purifying barrel 82 is attached to the valve body 86 for removal therefrom by means of a member 88 which is fixed to the valve body 86 by a fastening screw 90, the purifying barrel 82 being threadedly engaged with the outer thread of the member 88 so that the valve body 86 and the purifying barrel 82 are integrated with each other. A sealing ring 92 is interposed between and sealingly engaged with the purifying barrel 82 and the member 88. A sealing ring 94 is interposed between and sealingly engaged with the member 88 and valve body 86.

Figure 6:
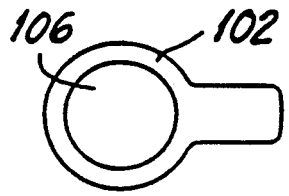
FIG. 6 is an end view of the lever of FIG. 5.

A casing 96 includes a cylindrical bore 98 formed therein, the valve body 86 being inserted in the cylindrical bore 98 in the casing 96 for rotation about the longitudinal axis of the valve body 86. The receptacle 84 is disposed outwardly of the casing 96 and attached to the casing 96 for removal therefrom, the receptacle 84 being threadedly engaged with the outer thread of the casing 96. A sealing ring 100 is interposed between and sealingly engaged with the receptacle 84 and the casing 96. A lever 102 is disposed outwardly of the casing 96 and attached to the valve body 86 on the opposite side to the purifying barrel 82 and the receptacle 84. The lever 102 is fixed to the valve body 86 by a fastening screw 104 which is covered by a cap 106. The cap 106 is fitted in a recess formed in the lever 102. The lever 102 includes a handle as shown in FIG. 6.

Figure 7:
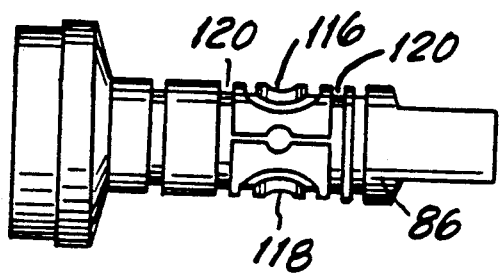
FIG. 7 is a side view of the valve body of FIG. 5.

A cap nut 108 is used to attach the casing 96 to the opening end of a faucet pipe in a manner as described concerning the embodiment shown in FIG. 2. The casing 96 has a tap water inlet port 110, a pair of tap water outlet ports 112 and a purified water outlet port 114 formed therein and opening to the cylindrical bore 98 in the casing 96 in the same manner as said embodiment. The valve body 86 includes first, second and third flow paths 116, 118 and 120 opening to the peripheral surface of the valve body 86 in the same manner as said embodiment, as shown in FIG. 7. The valve body 86 is provided with a pair of sealing rings 122 extending around the opening positions of the first and second flow paths 116 and 118 and sealingly engaged with the inner surface of the casing 96. The valve body 86 further includes sealing rings 124 and 126 extending peripherally of the valve body 86 and sealingly engaged with the inner surface of the casing 96. The first flow path 116 is communicated with one opening end 128 of the purifying barrel 82 by means of an axial and radial hole 130 formed in the member 88 and a flow channel 132 formed between the receptacle 84 and the purifying barrel 82. The second flow path 118 is communicated with the other opening end 134 of the purifying barrel 82 by means of an axial hole 136 formed in the member 88.

The casing 96 is provided with a ball 138 and a spring 140. A plurality of recesses 142 are formed in the peripheral surface of the valve body 86 at angular intervals in a circle extending along the peripheral surface of the valve body 86. The ball 138 is resiliently urged by the spring 140 to fit in one of the recesses 142 every time the valve body 86 is turned through 90°, the spring 140 being engaged with and supported by the flange 144 of a sleeve 146 which is adhesively fixed to the casing 96. A shower head 148 includes a number of small holes 150 and a central hole, the shower head being threadedly engaged at the central hole with the outer thread of the sleeve 146. A sealing ring 152 is interposed between and sealingly engaged with the shower head 148 and the casing 96. The small holes 150 are communicated with the tap water outlet ports 112.

In the water purifier shown in FIG. 5, the lever 102 can be operated to turn it integrally with the valve body 86 and the purifying barrel 82. When the lever 102, the valve body 86 and the purifying barrel 82 are turned to the angular position shown in FIGS. 5 and 6 and the ball 138 fits in one of the recesses 142, the first flow path 116 is aligned and communicated with the tap water inlet port 110 of the casing 96. The second flow path 118 is aligned and communicated with the purified water outlet port 114 of the casing 96. Accordingly, the tap water flows from the faucet pipe to the flow channel 132 in the receptacle 84 through the tap water inlet port 110 and the first flow path 116 to enter the one opening end 128 of the purifying barrel 82. The tap water then passes through the purifying barrel 82 to be purified by the filter medium therein and discharged from the other opening end 134 of the purifying barrel 82. The purified water is directed to the purified water outlet port 114 through the second flow path 118 and discharged from the shower head 148. When the lever 102, the valve body 86 and the purifying barrel 82 are turned through 90° from the angular position shown in FIG. 5 and the ball 138 fits in another recess 142, the third flow path 120 is aligned and communicated with the tap water inlet port 110. Accordingly, the tap water flows from the faucet pipe to the tap water outlet ports 112 through the tap water inlet port 110 and the third flow path 120 so that the tap water is discharged from the small holes 150 in the shower head 148 without passing through the receptable 84 and the purifying barrel 82.

When the lever 102, the valve body 86 and the purifying barrel 82 are turned through 180° from the angular position shown in FIG. 5 to be disposed upside down and the ball 138 fits in the recess 142, the second flow path 118 is aligned with the tap water inlet port 110 of the casing 96, the first flow path 116 being aligned with the purified water outlet port 114 of the casing 96. Accordingly, the tap water is forced to reversely flow through the purifying barrel 82 so that the purifying barrel 82 can be cleaned by the reversely flowing water. The clogging of the filter medium can be broken by the reversely flowing water. The water channels formed in the filter medium can be also broken by the reversely flowing water. It is also possible to prevent the germs from entering and bleeding in the purifying barrel 82 when the tap water purifier is left unused for a long time, in the same manner as the embodiment shown in FIG. 2.

Figure 8:
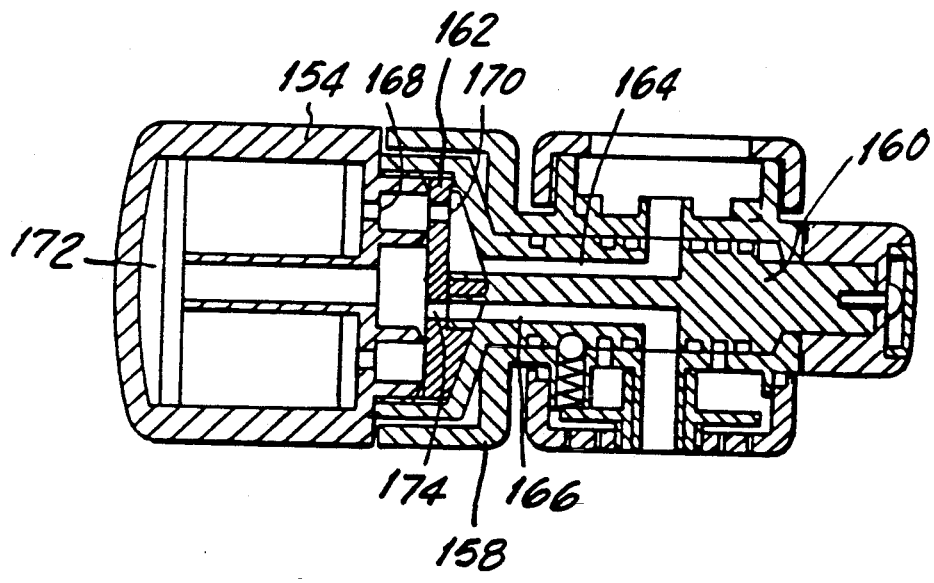
FIG. 8 is a sectional view showing the other embodiment.

FIG. 8 shows the other embodiment of the invention in which a purifying barrel 154 is disposed outwardly of the casing 158 and threadedly engaged with the inner thread formed in the valve body 160 to be attached thereto. Accordingly, the purifying barrel 154 can be removed from the valve body 160 for exchange for a fresh one. A rubber packing 162 is sandwiched between and sealingly engaged with the purifying barrel 154 and the valve body 160. The valve body 160 includes first and second flow paths 164 and 166, the first flow path 164 being communicated with one opening end 168 of the purifying barrel 154 by means of a through hole 170 formed in the rubber packing 162, the second flow path 166 being communicated with the other opening end 172 of the purifying barrel 154 by means of a through hole 174 formed in the rubber packing 162. Other parts and portions in this embodiment are substantially identical with the embodiment shown in FIG. 5.

It will thus be seen that the objects set forth above are efficiently attained. Since certain changes may be made in the above method and apparatus without departing from the scope of the invention, it is intended that all matter contained in the above description and shown in the accompanying drawings shall be interpreted as illustrative and not limiting.

It is also understood that the following claims are intended to cover all of the generic and specific features of the invention described herein.

What is claimed is:

1. A tap water purifier to be directly coupled to a faucet pipe comprising:
    a purifying barrel filled with a filter medium and having opposite opening ends;
    a casing including a cylindrical bore formed therein and having tap water inlet port means, tap water outlet port means and purified water outlet port means formed therein, said tap water inlet port means and said purified water outlet port means opening to said cylindrical bore of the casing at an angular distance of 180° from each other in the same axial position;
    a cylindrical valve body integral with said purifying barrel and inserted in said cylindrical bore of the casing for rotation about the longitudinal axis of the valve body;
    first flow path means formed in said valve body and communicated with one opening end of said purifying barrel;
    second flow path means formed in said valve body and communicated with the other opening end of said purifying barrel, said first and second flow path means opening to the peripheral surface of said valve body at an angular distance of 180° from each other in an axial position corresponding to the opening positions of said tap water inlet port means and said purified water outlet means; and
    third flow path means formed in said valve body and communicated with said tap water outlet port means, said third flow path means opening to the peripheral surface of said valve body in an angular position between the opening positions of said first and second flow path means and in said axial position corresponding to the opening position of said tap water inlet port means.

2. A tap water purifier according to claim 1 wherein said casing is attached to the opening end of a faucet pipe so that said faucet pipe is communicated with said tap water inlet port means of the casing.

3. A tap water purifier according to claim 2 wherein said valve body extends horizontally below said opening end of the faucet pipe, said tap water inlet port means extending between said opening end of the faucet pipe and said valve body, said tap water outlet port means and said purified water outlet port means extending downwardly of said valve body.

4. A tap water purifier according to claim 1 wherein said first flow path means comprises an axial hole and a radial hole formed in said valve body and communicated with each other, said axial hole of the first flow path means being communicated with said one opening end of the purifying barrel, said radial hole of the first flow path means opening to said peripheral surface of the valve body, said second flow path means comprising an axial hole and a radial hole formed in said valve body and communicated with each other, said axial hole of the second flow path means being communicated with said the other opening end of the purifying barrel, said radial hole of the second flow path means opening to said peripheral surface of the valve body.

5. A tap water purifier according to claim 4 wherein said third flow path means comprises axial groove means formed in the peripheral surface of said valve body in an angular position between the opening positions of said first and second flow path means, said axial groove means extending axially of said valve body to open to the peripheral surface of the valve body in said axial position corresponding to the opening position of said tap water inlet port means, said third flow path means further comprising annular groove means formed in the peripheral surface of said valve body, said annular groove means extending peripherally of said valve body to be communicated with said axial groove means and said tap water outlet port means of said casing.

6. A tap water purifier according to claim 1 wherein said purifying barrel is received in receptacle for removal therefrom, said receptacle being disposed outwardly of said casing and attached to said valve body for removal therefrom so that said receptacle can be operated to turn it integrally with said purifying barrel and said valve body about the longitudinal axis of said valve body.

7. A tap water purifier according to claim 1 wherein said purifying barrel is received in a receptacle for rotation about the longitudinal axis of said valve body and attached to said valve body for removal therefrom, said receptacle being disposed outwardly of said casing and attached to said casing for removal therefrom, and further comprising a lever disposed outwardly of said casing and attached to said valve body on the opposite side to said purifying barrel and said receptacle so that said lever can be operated to turn it integrally with said valve body and said purifying barrel.

8. A tap water purifier according to claim 1 wherein said purifying barrel is disposed outwardly of said casing and attached to said valve body for removal therefrom, and further comprising a lever disposed outwardly of said casing and attached to said valve body on the opposite side to said purifying barrel so that said lever can be operated to turn it integrally with said valve body and said purifying barrel.

* * * * *

UNITED STATES PATENT AND TRADEMARK OFFICE
CERTIFICATE OF CORRECTION

PATENT NO. : 5,192,436
DATED : March 9, 1993
INVENTOR(S) : Tsutomu Sasaki, et al It is certified that error appears in the above-indentified patent and that said Letters Patent is hereby corrected as shown below:

On the Title Page, Item [73], should be corrected from "Tsutomi Sasaki" to --Tsutomu Sasaki--.

Signed and Sealed this

Nineteenth Day of April, 1994

*Attest:*

BRUCE LEHMAN

*Attesting Officer*  Commissioner of Patents and Trademarks